Jan. 2, 1940. W. H. MUSSEY 2,185,514
ADJUSTABLE TIE-DOWN
Filed June 6, 1938 2 Sheets-Sheet 1
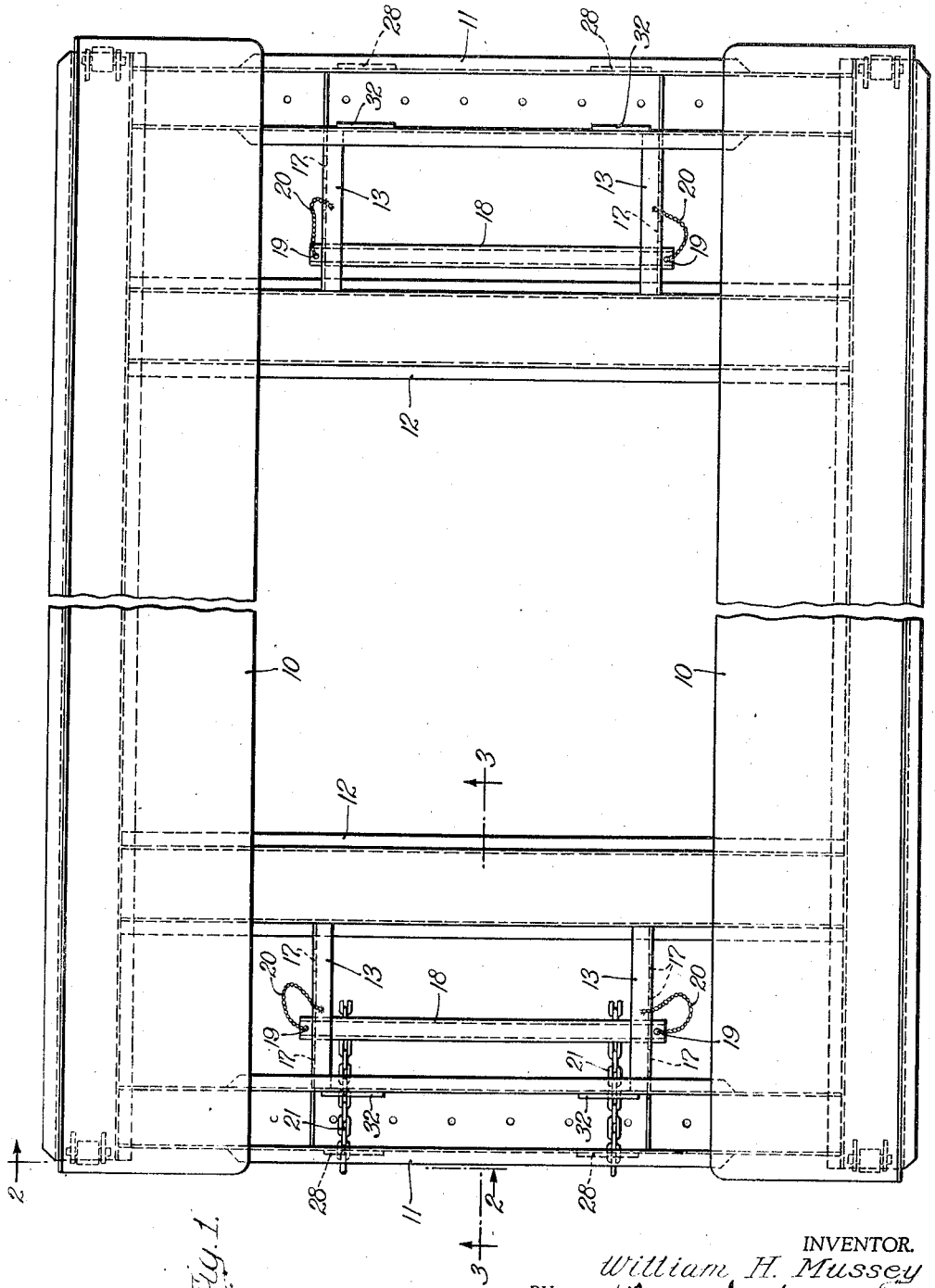
INVENTOR.
William H. Mussey
BY
ATTORNEY.

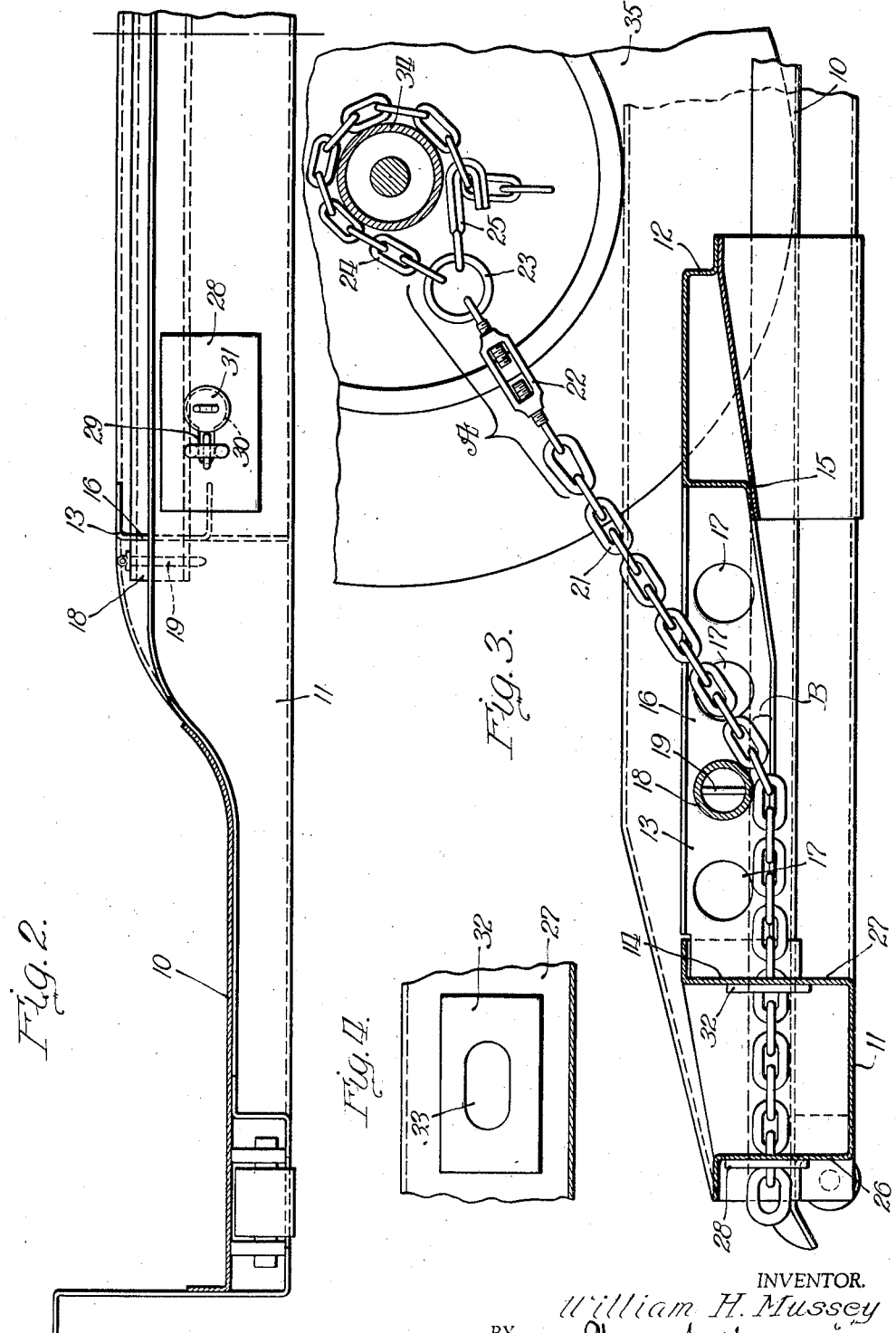

Patented Jan. 2, 1940

2,185,514

UNITED STATES PATENT OFFICE 2,185,514

ADJUSTABLE TIE-DOWN

William H. Mussey, Chicago, Ill.

Application June 6, 1938, Serial No. 211,992

14 Claims. (Cl. 105—368)

My invention relates to car loading devices known as tie-downs or hold-downs which are employed in anchoring an automobile or other wheeled vehicle to a deck or rack on which the vehicle is supported for transportation in a freight car.

In loading automobiles for shipment in freight cars it is common practice to support two automobiles upon the floor of the car and to support an elevated automobile upon a deck over each of the floor supported vehicles. The deck supported vehicle is securely fastened to the deck by means of chains or other flexible members, known as tie-downs, which are anchored to the deck and suitably attached to the wheeled vehicle.

In the transportation of some vehicles it is desirable that the flexible tie-down member be attached to the car axle; on others, to points on the vehicle underframe; on other makes of vehicles it is desirable to fix a bracket at some point on the vehicle underframe, and attach the flexible tie-down member to this bracket.

In anchoring a vehicle to a deck by means of flexible tie-down members it is desirable that the flexible members extend upwardly from the deck at the desired angle to the point of attachment on the vehicle so as to exert a downward pull in securing the vehicle to the deck.

The principal object of my invention is to provide a deck having tie-down members which are adjustable so as to be used with vehicles of varying size and manufacture for properly anchoring a vehicle to a deck and preventing movement of the vehicle on the deck.

A further object of my invention is to provide adjustable tie-down members having means for controlling the angularity of the chain or flexible member that is anchored at one end and suitably fastened to the vehicle at the opposite end.

Another object of my invention is to provide a vehicle supporting deck having adjustable tie-down members in the vicinity of the four corners of the deck.

Further objects of the invention will become apparent from the following description and the drawings relating thereto.

Referring to the drawings:

Figure 1 is a plan view of a deck for supporting a vehicle in a freight car having adjustable tie-down assemblies thereon, the middle portion of the deck being omitted as indicated by broken lines.

Figure 2 is an end view of a portion of the deck taken on line 2—2 of Fig. 1.

Figure 3 is an enlarged side view of one of the tie-down members, taken on the line 3—3 of Fig. 1.

Figure 4 is an enlarged front elevation of a reinforcing plate.

Similar reference numerals and letters refer to similar parts throughout the drawings.

As shown in Fig. 1 the deck comprises spaced longitudinally disposed wheel supporting runways 10, transversely disposed reinforcing end members 11 and intermediate transverse reinforcing members 12, suitably spaced from the end transverse members 11.

In the drawings each end of the deck is identical, and a description of my novel adjustable tie-down assemblies at one end of the deck is deemed to be sufficient.

At each end of the deck there are two transversely spaced, longitudinally extending tie-down frame members 13, each of which is adjacent one of the runways 10 and parallel thereto. These frame members span the distance between the end transverse member 11 and the adjacent intermediate transverse member 12, one end of each frame member 13 being welded or suitably attached to the end transverse member at 14 and the opposite end being similarly attached to the intermediate transverse member at 15. As shown in Fig. 2, the frame members 13 are of channel-shape, the web 16 of the channel being vertically disposed. The vertically disposed web 16 of each frame member has a plurality of longitudinally spaced circular openings 17, which openings accommodate a transversely disposed longitudinally adjustable bar 18. As clearly shown in the drawings, the ends of the longitudinally adjustable bar 18 pass through oppositely disposed circular openings 17 of the spaced frame members 13. When the bar 18 is placed in oppositely disposed openings at the desired point longitudinally of the deck, locking pins 19 are inserted in suitable openings adjacent each end of the bar, and the bar is thus held in the desired position. Loss of the locking pin is prevented by means of a small chain 20 attached to the pin at one end and welded or otherwise suitably attached to the frame member 13 at the opposite end.

In addition to the tie-down frame members 13 and adjustable bar 18 described hereinabove, the tie-down assembly includes adjacent each corner of the deck a flexible member, designated generally by the letter A, as shown in Fig. 3 of the drawings. The flexible member includes a lower chain portion 21, an intermediate turnbuckle 22 with an enlarged link 23 secured at one end of the turnbuckle, and a chain extension 24 and hook member 25 attached to the enlarged link 23.

The attachment or anchorage of one end of the flexible member to the deck and the opposite end to the deck supported vehicle is shown in Fig. 3. One of the flexible members is located adjacent each of the four corners of the deck.

As shown in Fig. 3, the end transverse member 11 is of channel shape, and includes a front upstanding leg 26 and a rear upstanding leg 27. The front leg has a reinforcing plate 28 welded, or suitably attached thereto in any desired manner. The plate 28 and the front leg 26 have an aligned slot 29 which is substantially parallel to the end transverse member 11. The slot 29 has an enlarged circular opening 30 at one end which can be closed by the plug 31 after the chain 21 is inserted in the enlarged end of the slot and a link of the chain is moved into the slot, so as to hold the chain 21 in the slot 29; the links adjoining the link in the slot being perpendicular to the slot whereby the chain is securely fastened in the slot. The plug 31 is placed in the enlarged circular opening 30 and prevents the chain from slipping out of locked position. The rear leg 27 of the end transverse member 11 has a reinforcing plate 32 welded or attached thereto in any desired manner. The plate 32 and the rear leg 26 have an aligned elongated opening 33 through which the chain 21 passes. An enlarged front elevation of this reinforcing plate 32 with the opening 33 is shown in Fig. 4.

From its locked point of anchorage in the slot 29, it is shown in Fig. 3 that the flexible member or chain extends rearwardly through the opening 33 and beneath the longitudinally adjustable bar 18, from which point the flexible member extends upwardly to the point of attachment on the deck supported vehicle. The position of the bar 18 regulates the angle indicated by the letter B in Fig. 3. The bar can be positioned in the desired openings 17 of the frame members 13, whereby the chain or flexible member can be attached at the desired point on the vehicle so as to exert a proper downward pull when the flexible member is tightened in the manner described hereinafter.

In operation, the vehicle is placed on the deck and the bars 18 are moved to the desired position longitudinally of the deck, the ends of the bar projecting through opposite openings 17 of the frame members 13 and being secured therein as described hereinabove. The position of the bar depends upon the length of the vehicle to be secured to the deck, the points on the vehicle to which the flexible members are to be attached and the angle at which it is desired that the flexible member or chain extend upwardly from the deck to the point of attachment to the vehicle. The end of the chain or flexible member 21 is locked in the slot 29 and the chain passes through the opening 33 in the plate 32 and rear leg 27, beneath the bar 18 and upwardly to the point of attachment to the vehicle. As shown in Fig. 3, the chain extension 24 is passed over the axle 34 of the wheel 35 of the deck supported vehicle. The chain passes over the axle and a suitable link is attached to the hook 25. The turnbuckle 22 is turned to take up slack in the chain and to tighten the chain to the desired degree in order to securely tie the vehicle to the deck.

As clearly shown in Fig. 1, there is a longitudinally adjustable bar 18 at each end of the deck extending transversely of the deck and each of these bars controls the angle of the two flexible tie-down members at that end of the deck.

My adjustable tie-down provides an effective means for securing vehicles of varying size and manufacture to a deck. The adjustability of the bars 18 enables the flexible members to be properly positioned with relation to the point on the vehicle to which each flexible member is secured, and the angle, at which the flexible members extend upwardly from the deck to the vehicle, can be properly controlled. My adjustable tiedown permits satisfactory use of the flexible tie-down members regardless of the wheel base of the vehicle or the point on the vehicle to which the flexible members are attached.

Although only one form of my invention has been described in detail it will be apparent to those skilled in the art that various modifications may be made without departing from the scope of the appended claims.

I claim:

1. An adjustable tie-down for a vehicle supporting deck comprising a flexible member fastened to the deck at one end and anchored to the vehicle at the opposite end, an adjustable bar mounted on the deck beneath which the flexible member passes and contacts, said deck having spaced members provided with a plurality of openings which are adapted to receive the ends of the bar and hold said bar at the desired point longitudinally of the deck and against vertical movement relative to said deck.

2. A vehicle supporting deck having two spaced members disposed longitudinally of the deck, said members being provided with a plurality of aligned openings, an adjustable bar secured against vertical movement relative to the deck said bar having ends which are received in any pair of the aligned openings and a flexible member anchored to the deck at one end, said flexible member passing beneath and contacting the under side of said bar and extending upwardly to the point of attachment to the vehicle.

3. A vehicle supporting deck having a flexible tie-down anchored thereto and a bar mounted on the deck and adapted to control the angle at which the flexible member extends from the deck to the point of attachment to the vehicle, said bar being adjustable longitudinally of the deck and secured against vertical movement relative to said deck, said flexible member contacting the under side of said bar and extending from the bar to the point of attachment to the vehicle.

4. A vehicle supporting deck provided with means for anchoring an adjustable bar at desired points longitudinally of the deck, a flexible member having one of its ends anchored to the deck, said flexible member passing beneath and in contact with said bar and secured to the vehicle at its opposite end and means for securing said adjustable bar against vertical movement relative to the deck.

5. A vehicle supporting deck having means for anchoring one end of a flexible tie-down member thereto, a bar on the deck disposed transversely of the deck, the bar being adjustable longitudinally of the deck and means for securing the bar against vertical movement relative to the deck, said flexible member passing beneath and contacting the under side of said bar and extending upwardly from said bar to the point of attachment to the vehicle.

6. A tie-down assembly for a vehicle supporting deck comprising a flexible member anchored to the deck at one end and attached to a vehicle at the opposite end and a member mounted on the deck which member is capable of adjustment longitudinally of the deck and adapted to be secured at the desired longitudinal point against vertical movement relative to said deck, an intermediate portion of said flexible member contacting the under side of said adjustable member and the flexible member extending upwardly from said point of contact to the point of attachment to the vehicle.

7. An adjustable tie-down for a vehicle supporting deck including a flexible member anchored to the deck at one end and fastened to a vehicle at the opposite end, and a bar mounted on the deck and secured against vertical movement relative to said deck beneath which bar the flexible member passes, said flexible member contacting the under side of said bar, and means for securing said bar at the desired point longitudinally of the deck.

8. A vehicle supporting deck having a flexible tie-down member anchored thereto and an adjustable bar mounted on the deck for controlling the angle at which the flexible member extends upwardly from the deck to a point of attachment to a vehicle, said bar being adjustable longitudinally of the deck and means for securing said bar against vertical movement relative to said deck, an intermediate portion of the flexible member passing beneath and contacting the under side of said bar.

9. Apparatus for adapting a tie-down assembly mounted on a vehicle supporting deck, to vehicles of varying size including a flexible member anchored to the deck at one end and fastened to the vehicle at the opposite end, and a bar supported by the deck, means on the deck for securing said bar against vertical movement relative to said deck at the desired point longitudinally of the deck, an intermediate portion of the flexible member passing beneath and contacting the under side of said bar.

10. A vehicle supporting deck having two spaced longitudinally disposed members provided with a plurality of aligned spaced openings, a transversely disposed bar adapted to be received in any pair of the aligned openings, and a flexible member anchored to the deck at one end, passing beneath the transversely disposed bar and extending upwardly to a point of attachment to the vehicle, said bar being secured against vertical movement relative to said deck and the flexible member contacting the under side of said bar.

11. A deck for supporting vehicles having tie-down assemblies including flexible members anchored to the deck and to the vehicle and a bar mounted on the deck and adjustable longitudinally of the deck, means for securing said bar against vertical movement relative to the deck, the flexible members passing beneath and contacting the under side of said bar and extending upwardly from said contact to the point of attachment to the vehicle.

12. A tie-down member for a vehicle supporting deck including a flexible member anchored to an end transverse member of the deck at one of its ends and attached to the vehicle at the opposite end, a bar mounted on the deck beneath which the flexible member passes, said flexible member contacting the under side of said bar and extending upwardly to the point of attachment to the vehicle, said bar being adjustable longitudinally of the deck and adapted to be secured against vertical movement relative to the deck at the desired longitudinal point.

13. A tie-down assembly for a vehicle supporting deck including a flexible member fastened to the deck at one end and to the vehicle at the opposite end and a bar mounted on the deck, beneath which bar the flexible member passes and contacts the under side of said bar, the bar being secured against vertical movement relative to said deck and adapted to be fixed in a plurality of positions longitudinally of the deck and control the angle at which the flexible member extends upwardly from the deck to the vehicle.

14. A tie-down assembly for a vehicle supporting deck including a flexible member comprising a lower chain portion anchored to the deck, an intermediate turnbuckle and a chain extension, one end of which is fastened to a vehicle mounted on the deck, and a bar which is capable of adjustment longitudinally of the deck and adapted to be secured against vertical movement relative to said deck, the flexible member passing beneath and contacting the under side of said bar and extending upwardly from this point of contact to the point of attachment to the vehicle.

WILLIAM H. MUSSEY.